Figure 1:
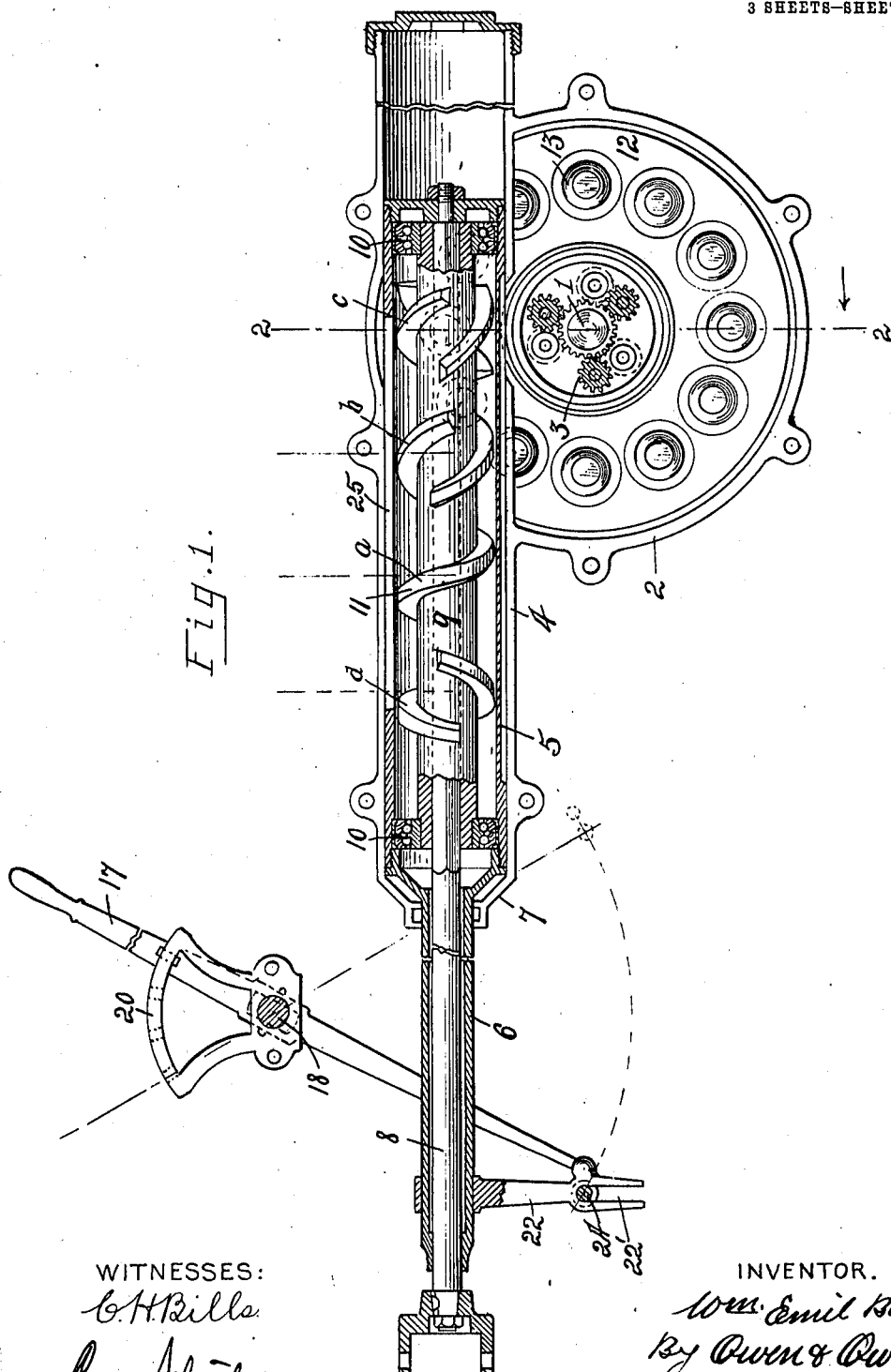

W. E. BOCK.
POWER TRANSMISSION MECHANISM.
APPLICATION FILED DEC. 18, 1909.

990,099.

Patented Apr. 18, 1911.
3 SHEETS—SHEET 1.

WITNESSES:

INVENTOR.

W. E. BOCK.
POWER TRANSMISSION MECHANISM.
APPLICATION FILED DEC. 18, 1909.
990,099.
Patented Apr. 18, 1911.
3 SHEETS—SHEET 2.
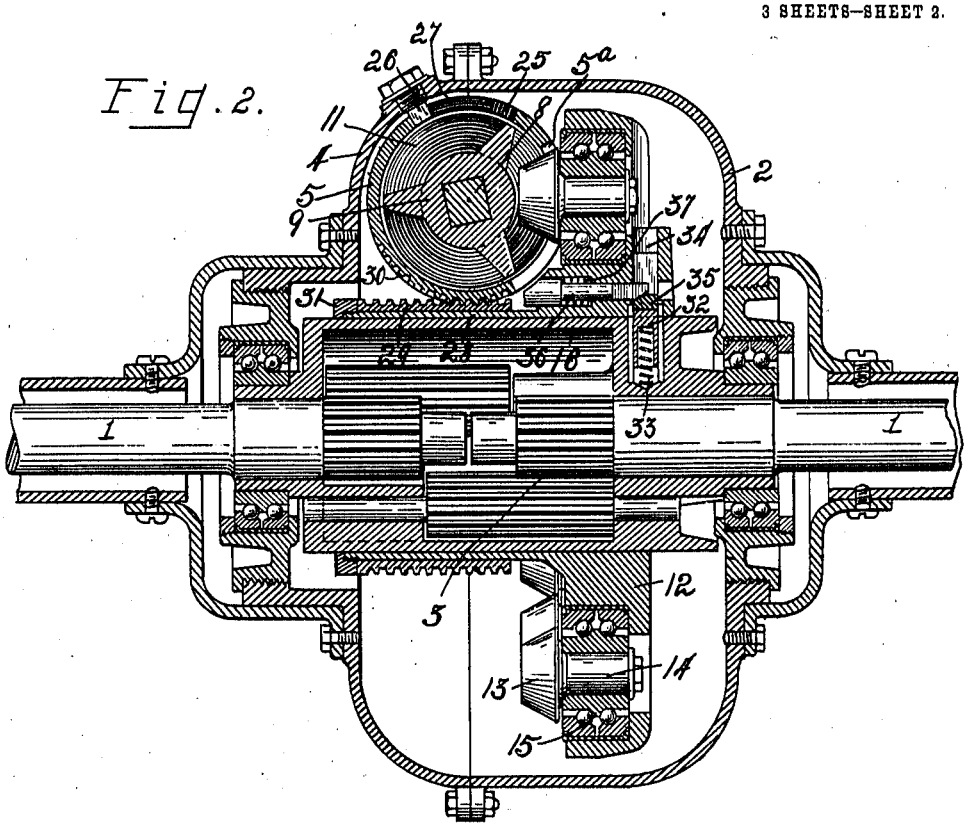
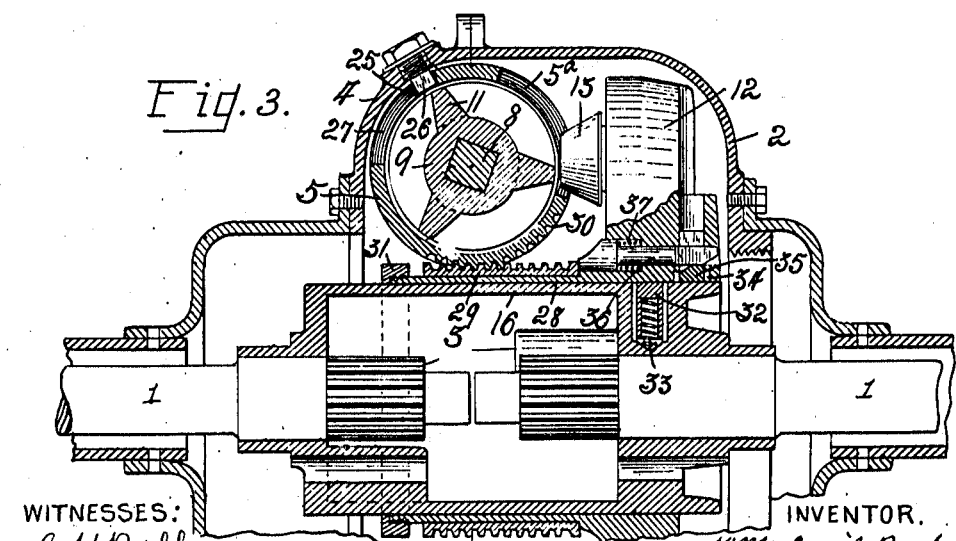
WITNESSES:
INVENTOR.

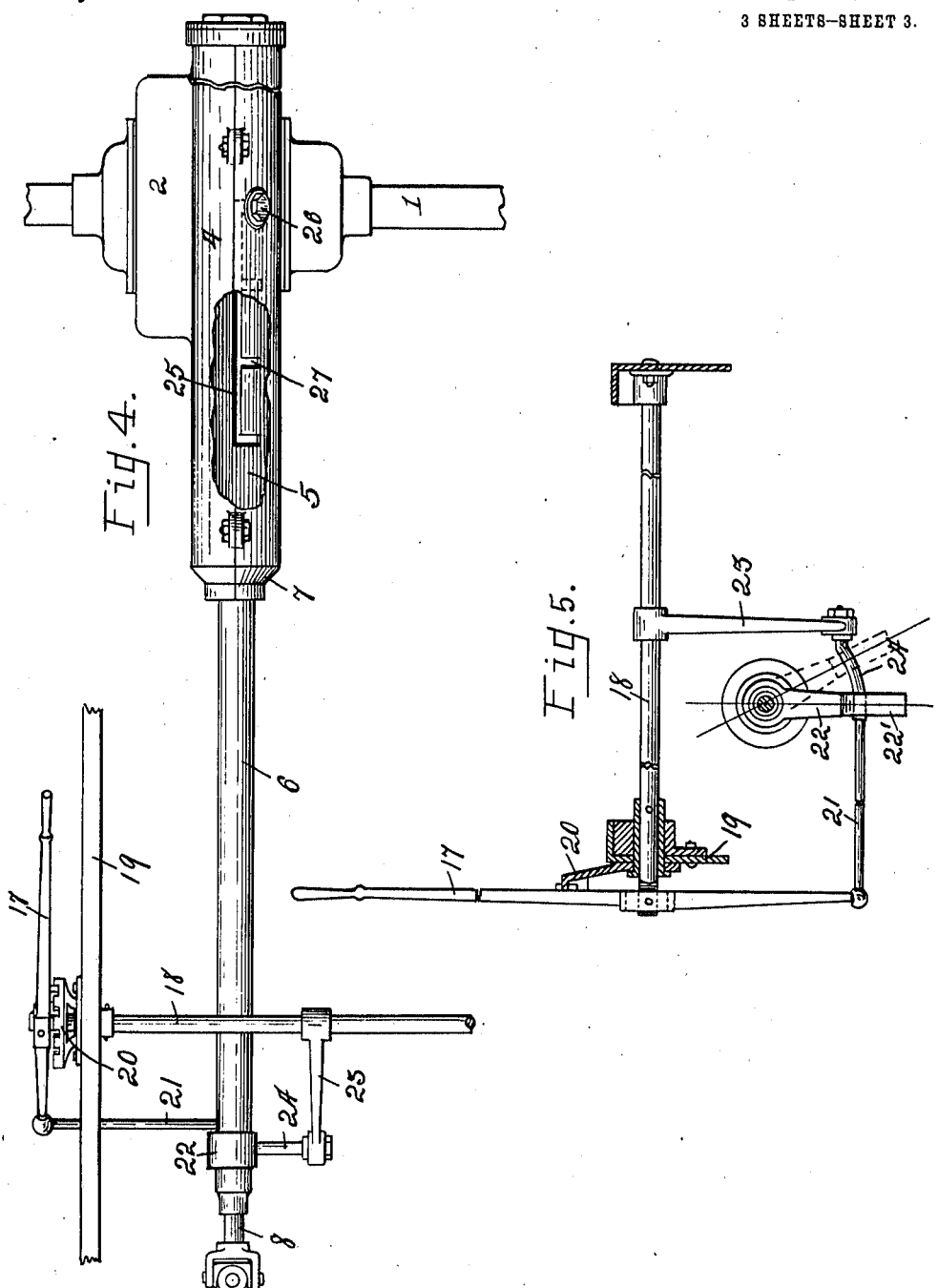

UNITED STATES PATENT OFFICE.

WILLIAM EMIL BOCK, OF TOLEDO, OHIO.

POWER-TRANSMISSION MECHANISM.

990,099.

Specification of Letters Patent. Patented Apr. 18, 1911.

Application filed December 18, 1909. Serial No. 533,812.

*To all whom it may concern:*

Be it known that I, WILLIAM E. BOCK, a citizen of the United States, and a resident of Toledo, in the county of Lucas and State of Ohio, have invented a certain new and useful Power-Transmission Mechanism; and I do hereby declare the following to be a full, clear, and exact description of the invention, such as will enable others skilled in the art to which it appertains to make and use the same, reference being had to the accompanying drawings, and to the figures and letters of reference marked thereon, which form a part of this specification.

My invention relates to power transmission mechanism of the class adapted to transmit rotation in either direction at various speeds to a driven part or parts from a shaft or driving member which is continuously driven in one direction at a uniform speed, and while it is particularly intended for use in motor driven vehicles, boats, or the like, it may be employed in any other connection for which it may be adapted or appropriate.

The object of my invention is the provision of a highly efficient mechanism of this class, which is simple, strong and durable in its construction, and easy and positive in its operation, and which is adapted to provide a direct drive between the driving and driven member, thus avoiding the usual intermediate speed and reversing gears heretofore used in mechanisms of this type and the consequent power losses incident to the use of such forms of mechanisms.

A further important object of my invention is to reduce the weight and cost of construction, repair and maintenance of mechanisms of this type, and also to effect a compact and neat arrangement of such mechanism with the axle or other driven part.

The invention is fully described in the following specification, and while in its broader aspect it is capable of being embodied in numerous forms, a preferred embodiment thereof is illustrated in the accompanying drawings, in which,—

Figure 1 is a sectional elevation of the preferred form of my invention. Fig. 2 is a transverse section of the same on the line 2 2 in Fig. 1. Fig. 3 is a similar view of a portion of the same with the driven member shifted out of mesh with the driving member. Fig. 4 is a plan of the mechanism with a part broken away. Fig. 5 is a transverse section of the same taken in advance of the controlling parts.

Referring to the drawings, 1 designates the driven shaft of the mechanism, or, in the present instance, the driving-axle of a vehicle, which shaft or axle has a case or housing 2 loosely mounted thereon in which the differential mechanism 3 of any suitable form is shown as being located, and which contains a part of the power transmitting mechanism, as hereinafter described.

The housing 2, at one side thereof, is formed or provided with an elongated transversely-disposed cylindrical part 4 which has an opening into the interior of the housing 2. A worm-case or frame 5 of suitable form is mounted for both longitudinal and rotary movements within the part 4. The case 5 has one end reduced and prolonged in the form of a sleeve 6, which projects through the reduced end 7 of the part 4 and has a sliding fit over the drive-shaft 8, which may be the motor-shaft of the vehicle.

A worm-shaft 9 is disposed within the case 5, with its ends mounted in suitable bearings 10 adjacent the ends of the case, which bearings retain the shaft axially centered for rotary movements therein, as indicated in Fig. 1. This worm shaft is provided with a series of longitudinally spaced worm sections or threads 11, which in the present instance are shown as being four in number and designated $a$, $b$, $c$ and $d$, the first three serving to drive a driven member 12 in mesh therewith in one direction, and the last to drive said member in a reverse direction. While the leads of these thread sections may be varied as desired to cause the driven member 12, when meshing with different one of such sections, to be driven at different speeds in the same or in a reverse direction, as the threads may be of right or left form, the axial pitch of the various sections remains constant and must coincide with the pitch of the teeth of the driven member. In the present instance the low speed worm section $a$, and the reverse section $d$, are shown as comprising single threads, the intermediate speed section $b$ double threads, and the high speed section $c$ triple threads. This, however, as well as the number of worm sections for the different directions of rotation or the diameters of the same may be changed as desired. The worm shaft is hollow or provided with an axial opening therethrough into which the adjacent end of a drive-shaft 8 slidingly fits, said shaft and opening being squared or otherwise suitably formed in cross-section to cause them to turn together.

The driven element 12 preferably but not necessarily comprises a crown-gear of which 13 are the teeth. These teeth preferably consist of rollers of truncated cone shape spaced to correspond to the axial pitch of the different threads 11, and each roller or tooth is carried by a stud or stem 14, which has a ball-bearing mount within a socket in the face of the gear, as shown at 15 Fig. 2. The side lines of the thread sections 11 and the conical rollers 12 should coincide, with the apexes of the rollers falling in the axial center of the worm and their bases tangentially adjacent to the addendum of the worm. The base diameters of the teeth or rollers depends upon the pitch diameter of the gear. This form of teeth is preferable as they have a rolling contact with but a minimum of acceleration at the beginning of the meshing and a like retardation of rolling when a tooth leaves the mesh of the gear. The teeth 13 project through an opening 5ª provided longitudinally in one side of the case. The gear 12 is mounted within the housing 2 on a drum 16, which drum incases the differential mechanism 3 when the apparatus is used in connection with the axle of a vehicle, and is mounted at its ends upon the inner end portions of the two parts of the axle 1, as is well understood in the art. It is thus apparent that a rotation of the worm 9, when any one of the worm sections 11 thereon is in mesh with the gear 12, will communicate rotation to such gear and the drum 16 on which it is mounted, which in turn will drive the shaft or axle 1.

17 designates a controller-lever which is carried by an end of the rock-shaft 18 for relative oscillatory movements longitudinally thereof but is adapted when oscillated transversely thereof to rock the shaft therewith, as indicated in Figs. 1, 4 and 5. The shaft 18 is suitably journaled in the vehicle frame 19 transversely of the drive-shaft 8. The lever 17, when standing in a vertical plane, is adapted to engage one of a number of notches in the side of a segment 20 secured to an adjacent frame part 19 and has its lower end projected below the shaft 18 and in ball and socket or universal connection with the outer end of a rod or link 21. This rod or link is disposed transversely of the vehicle frame and has its inner end in ball and socket or universal connection with an arm 22, which is fixed to and normally hangs pendent from the sleeve 6 projecting from the worm-case 5, thus adapting an oscillation of the controller lever 17 longitudinally of the shaft 18 to communicate a rocking movement to the sleeve 6 through the medium of the rod or link 21. On a rocking of the shaft 18 a longitudinal shifting movement is imparted to the sleeve 6 and case 5 to selectively throw the worm-sections into mesh with the gear 12, due to the arm 23 carried by such shaft having a laterally-projecting finger or rod 24 at its free end which works loosely in the slotted or notched end 22' of the arm 22 on said sleeve.

The worm-case 5 is provided longitudinally thereof with a slot 25 in which a stud or pin 26, projecting inwardly from the housing 4, works, and such slot has a plurality of notches 27 in one wall thereof with any one of which the stud 26 may be engaged when the arm 22 on the sleeve 6 stands in vertical position, thus locking the case 5 against longitudinal movement. It is thus apparent that two movements of the control-lever 17 are necessary to longitudinally shift the case 5 and inclosed worm 9, namely, the swinging of said lever longitudinally of the shaft 18 for the purpose of communicating a rocking movement to the arm 22, sleeve 6 and case 5 to release the engaged notch 27 from the stud 26 and to move the slot 25 into register with such stud, and, secondly, the swinging of said lever transversely of the shaft 18 to impart the requisite longitudinal movement to the worm-case 5 through the medium of the shaft 18, arm 23, finger 24, arm 22 and sleeve 6. The case 5 and its worm 9 having been shifted to throw the desired set of threads 11 into mesh with the driven-gear 12, the lever 17 is swung longitudinally of the shaft 18 into engagement with the proper notch in the segment 20, one of such notches being provided for each speed and the reverse, which return movement of the lever rocks the case 5 to place a registering notch 27 therein into engagement with the locking stud 26, to prevent further longitudinal movement of the case 5 and its worm until the case is again rocked to move the slot 25 into register with such stud.

In order to move the crown-gear 12 out of mesh with the worm 9 preparatory to shifting the position of such worm, said gear is mounted for sliding movements on the drum 16 and has its hub portion extended to form a sleeve 28 on which is mounted a collar 29 having a series of circumferential teeth in mesh with a set of teeth 30 on one side portion of the case 5, see Figs. 2 and 3. It is thus apparent that the collar 29 forms a rack, which is circular in cross-section to adapt it to remain in constant mesh with the teeth 30 on the case 5 during a rotation of the gear 12, and that, on a rocking of the case 5 to move the slot 25 therein into register with the stud 26, said collar and the gear 12 will be moved out of mesh with the worm 9, as shown in Fig. 3. The collar 29 is adapted to have a limited endwise movement on the sleeve 28, such movement being limited in one direction by a stop-collar 31 on the outer end of said sleeve and in the other direction by a shoulder at the inner end of said sleeve.

The gear 12 is keyed to the drum 16 by a radially movable yieldingly mounted key or pin 32, which is actuated by a spring 33 to normally engage a radially registering socket 34 in the gear hub. A release-block 35 is radially movable in the hub socket 34, and when moved inwardly effects a depression of the key 32 against its spring to release it from locking engagement with the hub socket and permit a relative turning of the gear and drum. The releasing movement of the block 35 is effected by the movement of the end of a trip-pin 36 across the outer side of such block, which block and pin have coacting beveled surfaces for such purpose. The pin 36 is mounted in the hub portion of the gear 12 transversely thereof and has its releasing movements actuated by the endwise movements of the collar 29 toward the gear 12 due to the inner end of the collar acting on the adjacent headed end of the pin 36, and has its retracting movements actuated by a compression-spring 37, as indicated in Figs. 2 and 3. While only one key 32 is shown it is evident that a plurality of the same may be employed if desired. In the use of this form of my invention, it is evident that to change the speed at which the gear 12 and associated parts are being driven, or to reverse the direction of rotation thereof, it is only necessary to swing the control-lever 17 outwardly from engagement with the segment 20, then transversely of the shaft 18 into a transverse plane with the desired notch in said segment, and then back toward the segment to place it into engagement with such notch. On the outward movement of the lever-handle the rod 21 at the lower end thereof is thrown inwardly, thus imparting a rocking movement to the attached arm 22 and through it to the sleeve 6 and worm-case 5, the latter turning within the housing 4. This movement of the case 5 releases the engaged notch 27 therein from the stud 26 and moves the slot 25 into register with such stud to permit a longitudinal shifting of said case and its worm. The lever 17 is now swung transversely of the shaft 18 a predetermined distance, thus rocking the shaft 18 and attached arm 23 and communicating a longitudinal movement to the sleeve 6 and case 5, through the medium of the arm 22 and finger 24 in engagement with which the arm 22 rocks. The position of the different sets of threads 11 being determined by the position of the lever 17 relative to the notches in the segment 20, the desired set of threads 11 of the worm 9 can be moved into engagement with the gear 12 by placing the lever 17 in engagement with the corresponding notch in said segment. On a rocking of the case 5 to move it into position to be longitudinally shifted, the gear 12 is moved out of mesh with the worm 11, due to the meshing of the teeth 30 on the case 5 with the teeth on the collar 29. The collar 29, on its endwise movement, first acts, however, on the trip-pin 36 to move it to effect an inward movement of the release block 35 and consequent release of the key 32 from engagement with the gear-hub socket 34, to permit a movement of the gear 12 relative to the drum 16. When the case 5 is again rocked to its normal operative position, the coöperating teeth on the case and collar 29 effect a return of the gear 12 to its operative position, and permits a reëngagement of the key 32 with the gear hub, as is apparent.

I wish it understood that my invention is not limited to any specific construction or arrangement of the parts except in so far as such limitations are specified in the claims.

Having thus described my invention, what I claim as new and desire to secure by Letters Patent, is,—

1. In a power transmission mechanism, a guide, a frame mounted in said guide for rotary and longitudinal shifting movements, a drive shaft carried by said case and having a plurality of worm sections, a driven member, means for locking the case against longitudinal movements when at one position of its rotary movements, and means for imparting rotary and longitudinal movements to the case to release the case and shift the shaft to selectively throw the worm sections into mesh with the driven member.

2. In a power transmission mechanism, a drive shaft, a longitudinally shiftable case encircling said shaft, a worm shaft carried by the case for shifting movements therewith over the drive shaft, said worm shaft having a plurality of worm sections, a driven member, means for locking the case against shifting movements, and means for moving the case to release the locking means and then to move it to selectively place the worm sections into driving engagement with the driven member.

3. In a power transmission mechanism, drive means having a plurality of worm sections, a driven member, and means for throwing the driven member into or out of mesh with the drive means and shifting the drive means to selectively place the worm sections in position to mesh with said driven member.

4. In a power transmission mechanism, drive means having a plurality of worm sections, a gear adapted to mesh with any one of said sections, and means for shifting said drive means to move any worm section in position to mesh with said gear and for moving the gear to permit such shifting of the worm section.

5. In a power transmission mechanism, a drive shaft having a plurality of worm sections of different leads, a driven member, and means for shifting said shaft to move any worm section into position to mesh with said member and moving said member to permit such shifting of the worm sections.

6. In a power transmission mechanism, a shiftable case, a plurality of worm sections carried by said case, a gear for meshing with any one of said sections, and means for moving said case to shift the worm sections to selectively engage the same with the gear and for moving the gear to permit such shifting of the worm sections.

7. In a power transmission mechanism, a rotary and longitudinally movable case having a toothed portion thereon, a plurality of worm sections carried by said case and shiftable therewith, a gear, a part in mesh with the toothed portion of said case and associated with the gear whereby a rotation of the case will move the gear transversely thereof, and means for imparting rotary movements to the case to shift the gear and longitudinal movements thereto to move any one of the worm sections into position to mesh with the gear.

8. In a power transmission mechanism, drive means having a plurality of worm sections, a gear for meshing with such means, a part to which said gear is keyed, and means for shifting the drive means to selectively throw the sections into mesh with said gear and for releasing the gear relative to the member to which it is keyed and moving the gear into or out of meshing position with the driving means.

9. In a power transmission mechanism, a shaft having a plurality of worm sections, a driven part, a gear mounted on said driven part and adapted to mesh with the worm sections, releasable means for keying the gear to said driven part, and mechanism for shifting the shaft to selectively move the worm sections into mesh with the gear and for releasing said key means and moving the gear into or out of position for meshing with the worm sections.

10. In a transmission gear device, the combination of a drive shaft journaled in bearings, a driven shaft journaled transversely thereto, a gear on the driven shaft, a multiple of variable speed gears driven by the drive shaft, and means for causing any of the variable gears to mesh with and directly drive the gear on the driven shaft and for effecting relative movements of the driven and drive gears to throw them out of mesh to permit a selective shifting of the latter.

11. In a transmission mechanism the combination with drive and driven shafts, a gear wheel on the driven shaft, a multiple of variable speed gears associated with the drive shaft and shiftable to selectively engage the gear wheel, of means operative to both shift the variable gears and to move the gear wheel to permit such shifting.

12. In a transmission mechanism, the combination with a driven gear and a multiple of variable speed drive gears shiftable to mesh therewith, of means operative both to selectively engage the drive and driven gears and to move the driven gear to permit such engagement.

13. In a transmission mechanism, the combination with a driven gear, and a multiple of worm sections, of means for shifting the worm sections to selectively engage the gear and selectively moving the gear and worm sections to permit such engagement, and a single controlling lever for such means.

14. In a transmission mechanism, a worm gear, a plurality of worm sections shiftable to selectively engage said gear, a drive shaft for the worm sections, means operative to shift the worm sections and to move the gear out of meshing position with the worm sections to permit such shifting, and a lever for controlling the movements of such mechanism.

15. In a transmission mechanism, a housing, a member mounted in said housing for rotary and longitudinal movements therein, a plurality of worm sections carried within such member, a drive shaft for such sections, a worm wheel, and means operative to impart both rotary and longitudinal movements to the member to selectively engage the worm sections with the wheel.

16. In a transmission mechanism, a guide, a frame mounted in said guide for rotary and longitudinal shifting movements, a plurality of worm sections in said frame, a drive shaft for such sections, a worm wheel, coöperating means on the guide and frame for locking the same against relative longitudinal movements when the frame is in one position of its rotary movements, and means for rocking the frame with the shaft as its axis to release such locking means and also operative to longitudinally shift the worm sections to selectively engage the same with the wheel.

17. In a transmission mechanism, a casing capable of rotary and longitudinal shifting movements, a plurality of worm sections rotatably mounted in said casing and longitudinally shiftable therewith, a worm gear, means actuated by a rotary movement of the casing to effect relative movements of the worm sections and gear to throw them out of meshing position, and means for imparting rotary movements to said casing and also longitudinal shifting movements thereto to selectively engage the worm sections with the gear.

18. In a transmission mechanism, a rotatable member, a plurality of worm sections, a worm gear, means actuated by rotary movements of said member to effect relative movements of the worm sections and gear to throw them out of meshing position, and means operative both to rotate such member and to shift the worm sections to selectively engage the same with the gear.

19. In a transmission mechanism, a rotatable member, a plurality of shiftable worm sections, a worm gear, a part to which said gear is keyed, means actuated by the rotation of said member to effect relative movements of the worm sections and gear to throw them out of mesh and to effect a release of the keyed engagement of said part and gear, and mechanism operative both to rotate said member and to shift the worm sections to selectively engage the gear.

20. In a transmission mechanism, a movable member, a plurality of shiftable worm sections, drive means for such sections, a driven shaft and worm wheel mounted on such shaft, means releasably locking said worm wheel and shaft against relative movements, means actuated by a movement of said member to release such locking means and move the worm gear out of meshing position with the worm sections, and mechanism operative both to move said member and to shift the worm sections to selectively engage the worm wheel.

21. In a transmission mechanism, a rotatable case, a plurality of worm sections mounted within such case, a drive shaft for such sections, a driven member, a worm wheel mounted on such driven member, releasable means for locking said member and wheel against relative movements, a plunger carried by said wheel and movable to effect a release of said locking means, means actuated by a rotary movement of said casing to impart movements to said plunger, and mechanism operative to rotate said casing and to shift the worm sections to selectively engage the worm wheel.

In testimony whereof, I have hereunto signed my name to this specification in the presence of two subscribing witnesses.

WILLIAM EMIL BOCK.

Witnesses:
C. W. OWEN,
E. E. THOMAS.